United States Patent [19]
Gasner

[11] 3,786,687
[45] Jan. 22, 1974

[54] UNITIZED CLUTCH DRUM AND SPROCKET

[75] Inventor: William Lavier Gasner, Carson, Calif.

[73] Assignee: McCulloch Corporation, Los Angeles, Calif.

[22] Filed: Nov. 7, 1972

[21] Appl. No.: 304,313

[52] U.S. Cl............................ 74/243 CS, 143/32 F
[51] Int. Cl............................................ F16h 55/30
[58] Field of Search...................... 74/243 R, 243 CS

[56] References Cited
UNITED STATES PATENTS

| | | | |
|---|---|---|---|
| 3,683,980 | 8/1972 | Gasner | 74/243 CS X |
| 3,279,272 | 10/1966 | Gudmundsen | 74/243 CS |
| 3,144,890 | 8/1964 | Irgens | 74/243 CS X |

*Primary Examiner*—Allan D. Herrmann
*Assistant Examiner*—Lance W. Chandler

[57] ABSTRACT

A unitized clutch drum and coaxially aligned chain driving sprocket and a method of fabrication thereof from a single blank is provided. An outside cylindrical wall of an apertured blank is stamped to form a clutch drum friction face. An interior portion of the blank is stamped a first time to form a cup-shaped depression which extends oppositely from the cylindrical wall. This cup-shaped depression is supported by webs intermediate the apertures in the blank. This interior portion of the blank is stamped a second time to form a set of oppositely facing tang receiving pockets which set comprises the sprocket portion of the unit.

7 Claims, 5 Drawing Figures

UNITIZED CLUTCH DRUM AND SPROCKET

BACKGROUND OF THE INVENTION

This invention relates to a sprocket drive mechanism for a chain of a chain saw and, more particularly, to a sprocket drive mechanism for such a chain of a chain saw wherein the sprocket is integrally formed with a clutch drum.

Chain saws generally comprise four major components, namely, an endless saw chain to do the cutting, an elongated bar or arm to support the chain and around the edges of which the chain is constrained to travel, power means usally comprising a prime mover such as a gasoline engine or an electric motor, and means to drivingly connect the drive shaft of the power means with the saw chain.

It is the means affording this driving connection between the drive shaft of the power means and the saw chain to which the invention is directed. Such a driving connection can, of course, be effected by training the saw chain over a drive sprocket fixed directly to the drive shaft of the power means so that the saw chain is at all times drivingly connected with that shaft. However, this expedient is undesirable, and it is now common practice to maintain the saw chain out of driving relationship with the drive shaft of the power means until the latter has achieved a predetermined speed of rotation.

For that purpose, the drive sprocket is ordinarily supported for rotation relative to the drive shaft of the power means, and is drivingly connectable therewith by a centrifugally responsive clutch mechanism. Such clutch mechanism, for example, may comprise a drum fixedly secured to the drive sprocket for rotation therewith, and a plurality of centrifugally responsive friction shoes. These friction shoes are drivingly connected with the drive shaft of the power means and move radially outwardly into frictional driving engagement with a wall on the drum as a consequence of rotation of the power shaft at a speed above a predetermined value. As a result, the saw chain cannot operate until the engine or other prime mover reaches a predetermined speed.

To assure that the sprocket and clutch drum rotate in unison, the sprocket and clutch drum have generally been fixed to one another by brazing, silver soldering, or an equivalent bonding operation. As will be appreciated, such arrangements require that the sprocket unit be carefully centered in the clutch drum prior to the bonding operation to insure that the sprocket and clutch drum are coaxially aligned. Otherwise, the sprocket will run eccentrically during use. Such eccentric sprocket operation may be a basic cause of many operational disorders, including improper travel of the chain and pulsating travel as the sprocket completes each rotation. A further source of operational difficulty may lie in the fact that in time, chain breakage is often directly traceable to the use of such an eccentrically running sprocket since the tension and relaxing of tension during each sprocket rotation may produce undesirable stresses in the chain in excess of those incident to delivery of the intended useful load.

Despite care taken to avoid eccentricity, it will be appreciated that that assembly and bonding operations may nevertheless engender eccentricity problems. It would, therefore, be desirable to provide a chain saw clutch drum and sprocket assembly that minimizes the possibility of introducing such eccentricity problems.

It has been the usual practice to fabricate chain saw sprockets from casting and/or forging operations. The sprocket may be produced by a forging of a metal block to a desired form, or by casting molten metal into a suitable mold. Forged units can be produced to a fair tolerance during quaintity operations. However, such units are expensive and require the use of heavy and relatively expensive manufacturing equipment. Cast sprockets can be more cheaply manufactured, but not to the close tolerances which are currently demanded in many fields of use, so that such cast units must be machined or otherwise finished to be acceptable for satifactory service. Such subsequent finishing operations are often expensive and involve the use of costly equipment in order to cut the faces of the sprocket teeth to accuracy.

Moreover, it has become increasingly desirable in the sale and promotion of chain saws to utilize a saw clutch drum and sprocket manufactured for short-life demonstrator models. In such an application, the unit cost of producing such models must, of economic necessity, be minimized.

It would, therefore, also be desirable to provide an economic fabrication technique for forming a chain saw sprocket within desirable tolerance limits.

The present invention concerns an improved clutch drum and socket unit which is integrally fabricated from a single sheet metal blank by stamping or pressing and related operations, as distinguished from sprockets which are made by casting and/or forging operations wherein the sprocket is produced by a forging of a metal block into a desired form or by casting molted metal into a suitable mold and then brazing or soldering the sprocket onto a clutch drum.

OBJECTS AND SUMMARY OF A PREFERRED FORM OF THE INVENTION

It is, therefore, a general object of the invention to provide a unitized chain saw clutch drum and sprocket and a method for the fabrication thereof which obviates or minimizes at least some of the problems of the type previously noted.

It is a particular object of the invention to provide a unitized chain saw clutch drum and sprocket which may be simply and economically fabricated from a sheet metal pressing or stamping operation or series of stamping operations.

It is a further object of this invention to provide a chain saw clutch drum and sprocket with improved concentricity of clutch drum and sprocket combinations.

A more specific object of this invention is to provide a unitized chain saw clutch drum and sprocket which may be stamped from a single sheet metal blank and thereby eliminate the necessity for coaxially aligning a sprocket with a chain saw clutch drum prior to a bonding operation.

It is likewise an object of this invention to eliminate a bonding operation in the fabrication of a chain saw clutch drum and sprocket.

It is likewise an object of this invention to eliminate machinery or finishing steps required in the fabrication of known chain saw sprockets.

Still another object of this invention is to provide a unitized clutch drum and sprocket for a chain saw which will drive the chain, guide the chain along a circular path, and aid in preventing lateral movement of the chain with respect to the plane of its path.

A unitized chain saw clutch drum and sprocket according to a preferred embodiment of the invention intended to accomplish some of the foregoing objects, is fabricated from a sheet metal blank which is stamped at least twice. The generally circular blank has an aperture at its center. At a predetermined radial distance from the center of the blank are four circumferentially disposed apertures. Defined between the central circular aperture and the four circumferentially disposed apertures is an interior, generally annular shaped portion of the blank.

The blank is stamped so as to displace this interior generally annular shaped portion a predetermined distance from the remainder of the blank. The amount of this displacement will correspond to the clearance between the sprocket and clutch drum required for travel of the cutter hooks on the particular saw chain to be used in connection with this sprocket and clutch drum unit.

This displaced portion of the blank is further stamped in order to form eight pockets for receiving projections on a chain of the type having side links and center links alternately connected by pintles or other hinge means. On such a chain each of the center links has sprocket engaging projections or "tangs" which successively engage the pockets of the sprocket portion of the unit. A cylindrical wall along the outer radius of the blank functions as a clutch drum friction face.

While a unitized clutch drum and sprocket embodying the features of the present invention may be used for the many various purposes for which a clutch drum and sprocket assembly may have been designed, a primary field of usefulness for a unitized clutch drum and sprocket embodying the present invention is in connection with engine driven chain saws.

THE DRAWINGS

Other objects and advantages of the present invention will become apparent with reference to the following detailed description of a preferred embodiment thereof in connection with the accompanying drawings, in which.

DETAILED DESCRIPTION OF A PREFERRED EMBODIMENT OF THE INVENTION

Figure 1:
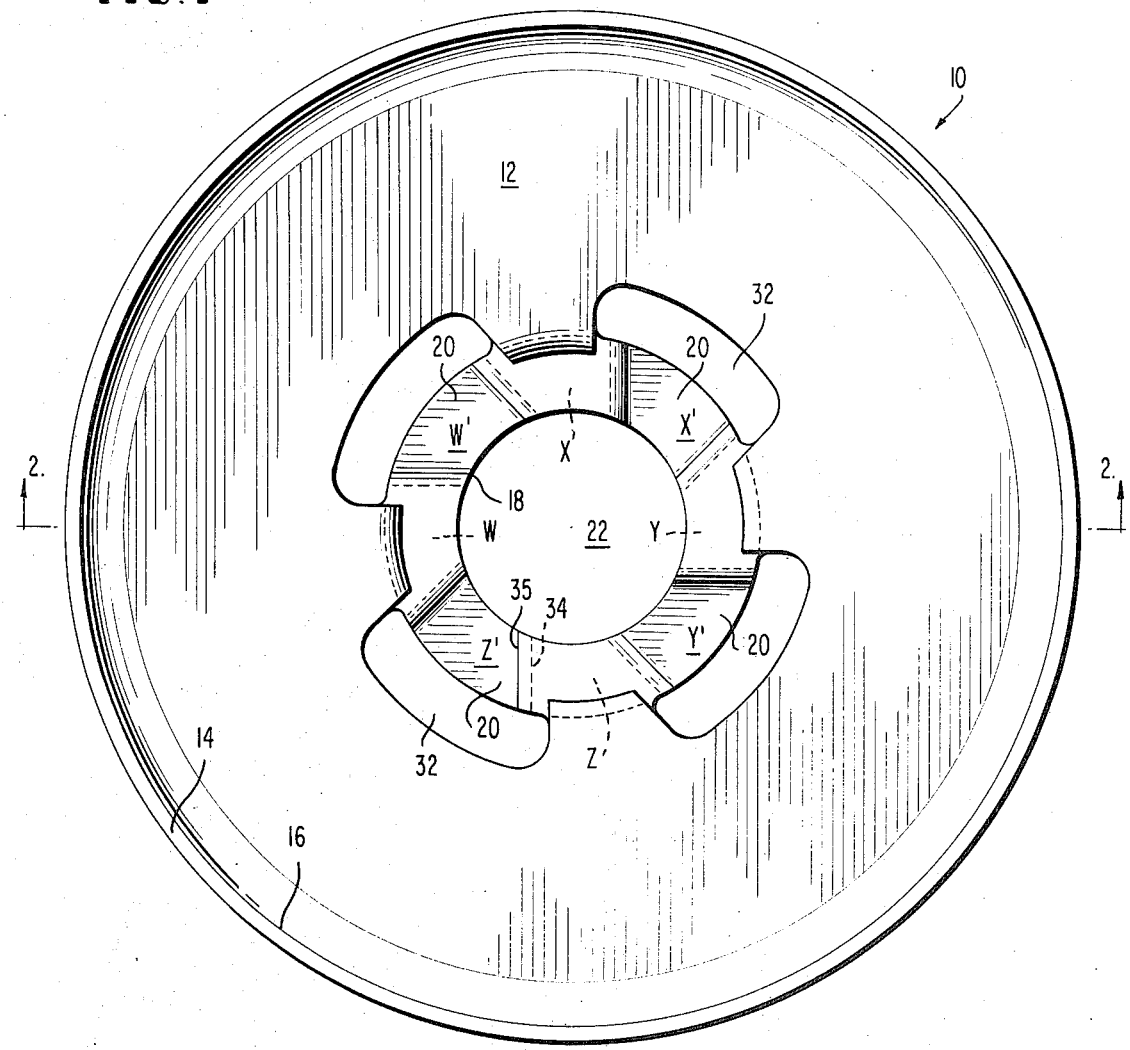
FIG. 1 is a bottom view of a unitized clutch drum and chain saw sprocket according to this invention.

Referring now to the drawings, wherein like reference characters have been applied to like parts throughout, in FIG. 1 there can be seen a unitized clutch drum and chain saw sprocket 10 having a generally planar base portion 12. An intergral cylindrical wall 14, having an interior surface 16 which functions as a clutch drum friction face, projects outwardly from the planar base portion 12 in one direction. An interior annulus 18 has been displaced in the opposite direction by an amount sufficient to provide clearance between the sprocket and clutch drum for cutter hooks on the saw chain to be used. Eight tang pocket faces are formed by further stamping of four portions of the annulus 18. These eight tang pocket faces are comprised of four interior tang pocket faces 20 and four exterior tang pocket faces 21. These tang pocket faces 20, 21 form a set of eight successive tang pockets W, W', X, X', Y, Y', Z, Z'. This set of pockets functions as the sprocket portion of the unit. A central aperture 22 is provided to support the unitized clutch drum and sprocket 10 through a stationary shaft (not shown) and a suitable bearing (also not shown) in a manner known to those persons skilled in this art.

Figure 2:
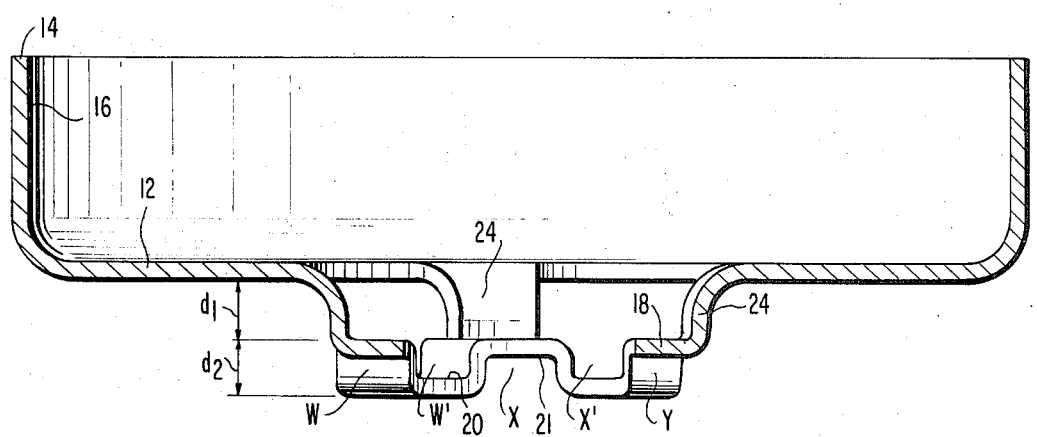
FIG. 2 is a cross-section taken on the plane of line 2—2 in FIG. 1.

In FIG. 2, it can be seen that the sprocket portion of the unit is supported by a plurality of webs 24.

Figure 3:
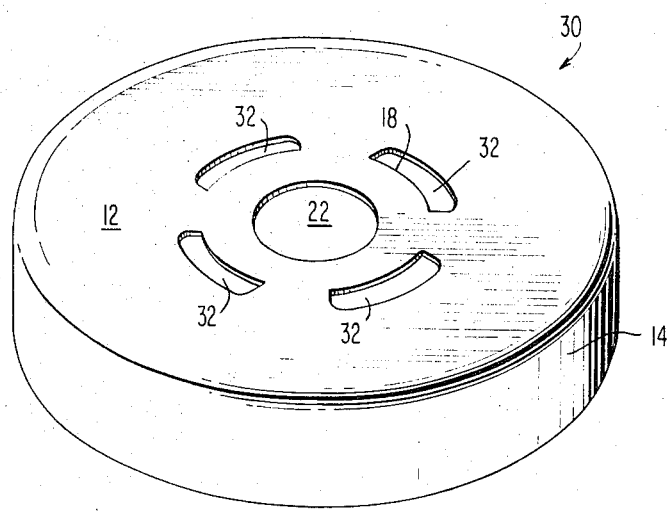
FIG. 3 is a perspective view of a blank from which a unitized clutch drum and sprocket according to the present invention may be stamped.

In FIG. 3, a blank 30 from which the unitized clutch drum and and sprocket 10 will be stamped is depicted. This blank 30 has the central aperture 22 and four circumferentially disposed apertures 32. These circumferentially disposed apertures 32 are in the form of uniformly spaced arcuate slots disposed intermediate those portions of the blank 30 which will become sprocket supporting webs 24 (see FIG. 2.)

It will, of course, be appreciated to those skilled in this art that the blank 30 may be either cup-shaped as shown in FIG. 3 or may be completely flat. If a completely flat blank is utilized, the cylindrical wall 14, the interior surface of which functions as the clutch drum friction face, may be formed by a separate stamping operation either prior or subsequent to the stamping of the sprocket portion herein described more fully below.

Figure 4:
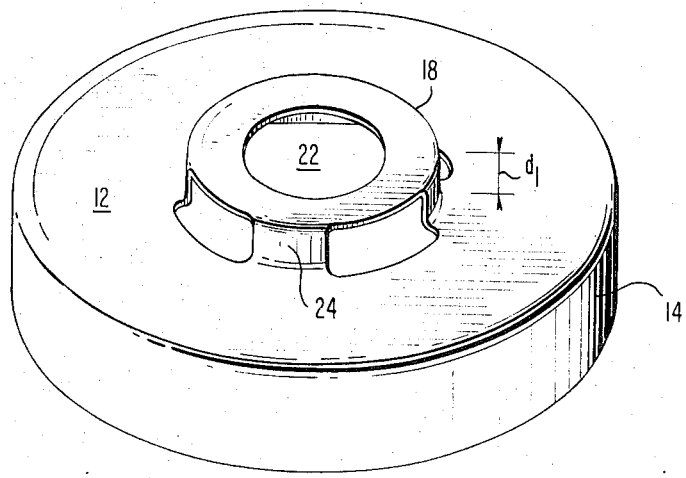
FIG. 4 is a perspective view of the blank of FIG. 3 which has been stamped to displace an interior generally annular shaped portion.

Turning now to FIG. 4, it can be seen that in the first strike of the stamping process to form the sprocket portion, the interior annulus 18 is displaced a distance $d_1$ above the base 12 of the blank. This distance will correspond to the clearance required for the cutter hooks on the saw chain (not shown) which would be used in connection with this sprocket and clutch drum unit. As illustrated in FIG. 4, the interior annulus 18 is supported by the webs 24. Although four such webs 24 are preferred, there is no intention to limit this invention to any particular number. The construction details of the chain to be used with the unitized clutch drum and sprocket will generally dictate the number of sprocket pockets required for satisfactory performance. The portions of the inner annulus 18 immediately adjacent and contiguous with the webs 24 will become, as it will later be shown, the exterior tang pocket faces 21 of four of the eight tang pockets of the sprocket portion.

Figure 5:
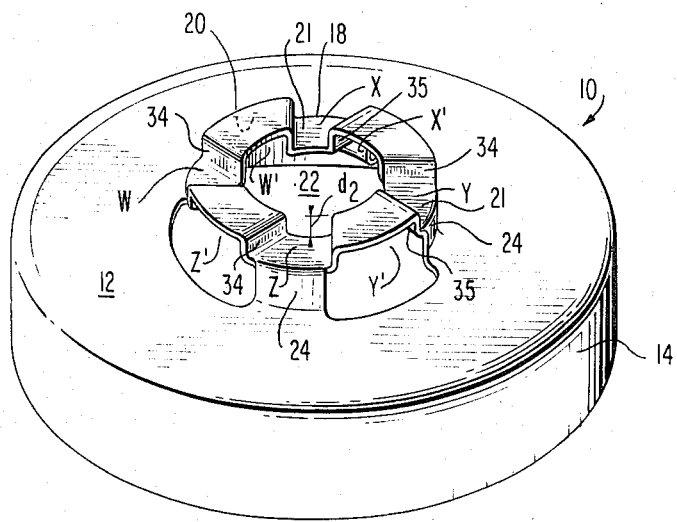
FIG. 5 is the blank of FIG. 4 which has been further stamped to form a completed unitized clutch drum and sprocket.

In FIG. 5, the blank 30 is illustrated after having been struck in four areas to displace portions of the interior annulus 18 further in a direction opposite to the projection of the clutch drum friction face 14 by a distance $d_2$ corresponding to the thickness of the tangs on the chain to be used in connection with this unitized sprocket and clutch drum. In this second striking operation, the interior tang pocket faces 20 are formed adjacent the circumferentially disposed apertures 32.

The interior tang pocket faces are supported by side walls having an exterior face 34 and an interior face 35 as may be seen in FIG. 5. The exterior faces 34 of the side walls and the exterior tang pocket faces 21 formed as a result of the initial displacement of the annulus 18 cooperate to define four exterior tang pockets W, X, Y, and Z; and the interior faces 35 of the side walls and the interior tang pocket faces 20 cooperate to define four interior tang pockets W', X', Y' and Z'.

In this fashion two alternating sets of circumferentially spaced, oppositely facing pockets are formed, with the group of pockets being operable to receive successive tangs on the saw chain in such a manner that the chain is somewhat constrained against moving laterally with respect to a plane intended to be defined by the zone of movement of the chain. In other words, movement at right angles to the direction of movement of the chain is essentially prevented by the tang pocket faces 20, 21 of the alternate tang pockets. Since the chain is relatively rigid in a direction at right angles to its plane of movement, this rigidity and the alternate pockets cooperate to militate against chain movement laterally because each of the tangs of the chain is held by the alternate faces of the tang pockets.

As will be appreciated, receipt of the tangs in the pockets is permitted by reason of the generally U-shaped channel contour of the pockets, one open end of the channels being formed in the case of the pockets W', X', Y' and Z', by the zones of the original slots 32.

It will, of course, be apparent to those skilled in this art that a unitized clutch drum and sprocket having more or less than the light tang pockets shown in FIG. 5 could be fabricated according to this invention. The number of tang pockets will generally depend upon the size and type of saw chain to be used; the sprocket configuration will generally correspond to chain saw tooth and tang contours and spacings.

In FIGS. 1 and 5 it will be seen that the side walls 34 of each of the tang pockets are angulated with respect to a radius of the inner annulus 18 to correspond to one type of tang being used on a particular saw chain. This angle may vary with the use to which the chain will be put and selection of the angle represents considerations which will be familiar to those skilled in this art. Through the present invention, formation of the angle within appropriate tolerances is facilitated.

In the fabrication of a unitized clutch drum and sprocket according to the present invention, a low carbon steel having an approximate thickness of 0.050 inch is preferably for the blank. The utilization of low carbon steel substantially reduces the stress in the clutch drum and sprocket unit during fabrication. Since low carbon steel is relatively "soft," the blank 30 will offer less resistance to the stamping operation which may be performed with an appropriate tool of a convenient type. To provide additional strength to the sprocket and to increase its resistance to wear, it may be desirable to harden the sprocket portion subsequent to stamping by a surface hardening process, such as by the use of cyanides, carbonization operations, and other similar surface hardening techniques which are well known in the metal arts. Thus, it can be seen that in accordance with the present invention, a unitized clutch drum and sprocket may be fabricated from relatively soft steel while at the same time providing increased resistance to wear.

As noted above, the blank 30 may be generally cup-shaped (as shown in FIG. 3) or may be left flat with the cylindrical wall portion 14 formed either prior to or subsequent to the stamping of the sprocket portion. The sprocket and clutch drum unit may be progressively formed from a cold blank.

It will be appreciated that in fabricating a clutch drum and sprocket according to the present invention, certain significant advantages are provided.

In particular, the stamping process assures that the sprocket and clutch drum will be concentrically aligned to eliminate the possibility of eccentric sprocket operation. Moreover, it can be seen that this stamping process provides a simple and economical method of fabrication. The unitized feature of the sprocket and clutch drum eliminates the necessity of brazing, soldering, or welding these portions together, thereby simplifying considerably the fabrication process. It may also be noted that the sprocket portion of the present invention will prevent sidewise movement of the chain as it drives over the sprocket.

Although the present invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. A unitized clutch drum and coaxially aligned chain driving sprocket integrally formed therewith from a single blank comprising:
   a clutch drum portion comprising:
   a generally circular base;
   a cylindrical wall contiguous with said circular base;
   said base having a support member-receiving axial opening therein; and
   a sprocket integral with and in spaced apart relationship to said base and arranged to rotate coaxially with said clutch drum when said clutch drum rotates about a support member.

2. The unitized clutch drum and coaxially aligned chain driving sprocket of claim 1 wherein said base comprises means defining a central aperture providing said axial opening and means defining a plurality of apertures circumferentially disposed at a predetermined radial distance from said central aperture.

3. The unitized clutch drum and coaxially aligned chain driving sprocket of claim 1 wherein said unitized clutch drum and said sprocket are comprised of low carbon steel.

4. The unitized clutch drum and coaxially aligned chain driving sprocket of claim 3 wherein said sprocket is comprised of low carbon steel which has been hardened.

5. A unitized clutch drum and a concentrically aligned chain driving sprocket integrally formed therewith from a single blank comprising:
   a clutch drum portion comprising:
   a generally circular base;
   a cylindrical wall adjacent and integral with said circular base;
   said base having a support member-receiving axial opening therein;
   a sprocket comprising:
   two sets of circumferentially spaced pockets;
   each of said sets being oppositely facing and arranged for the successive engagement of a portion of a chain to substantially orient the chain in a uniform plane in relation to said sprocket; and
said sprocket being integral with and in spaced apart relationship to said base and arranged to rotate concentrically with said clutch arm when said clutch drum rotates about a support member.

6. The unitized clutch drum and a concentrically aligned chain driving sprocket of claim 5 wherein each of said pockets comprises at least one angulated side wall means contiguous with a face and angulated with respect to a radius of said pocket for engaging a chain.

7. An integrated clutch drum and chain driving sprocket unit comprising:
a clutch drum portion including:
a base section; and
a generally cylindrical friction drivable face projecting from said base portion in one direction;
a sprocket portion integral with and coaxially aligned with said clutch drum portion and including:
a first set of circumferentially spaced tang receiving pockets facin outwardly in a direction opposite to said one direction;
a second set of circumferentially spaced tang receiving pockets facing inwardly in said one direction, and
said tang receiving pockets of said first and second sets alternating with one another and providing means defining a generally planar chain travel path resistive of lateral chains displacement, and
circumferentially spaced web means, contiguous with said base section and said first set of pockets, and projecting in a direction opposite to said one direction for supporting said sprocket portion at said first set of pockets; and
said second set of pockets being open adjacent said web means.

* * * * *